(12) United States Patent
Hirobe et al.

(10) Patent No.: US 11,757,476 B2
(45) Date of Patent: Sep. 12, 2023

(54) RADIO FREQUENCY MODULE AND COMMUNICATION DEVICE

(71) Applicant: Murata Manufacturing Co., Ltd., Kyoto (JP)

(72) Inventors: Masakazu Hirobe, Kyoto (JP); Takanori Uejima, Kyoto (JP); Yoshihiro Daimon, Kyoto (JP); Nanami Yumura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/157,265

(22) Filed: Jan. 20, 2023

(65) Prior Publication Data

US 2023/0155611 A1    May 18, 2023

Related U.S. Application Data

(63) Continuation of application No. PCT/JP2021/028535, filed on Aug. 2, 2021.

(30) Foreign Application Priority Data

Aug. 13, 2020    (JP) ................. 2020-136565

(51) Int. Cl.
*H04B 1/00* (2006.01)
*H04B 1/16* (2006.01)

(52) U.S. Cl.
CPC ......... *H04B 1/0078* (2013.01); *H04B 1/1615* (2013.01)

(58) Field of Classification Search
CPC .............. H04B 1/006; H04B 1/0057; H04B 2001/0408; H04B 1/0458; H04B 1/525;
(Continued)

(56) References Cited

U.S. PATENT DOCUMENTS

2002/0196085 A1    12/2002    Nakamata et al.
2012/0243447 A1*    9/2012    Weissman ............ H04B 1/0458
370/280
(Continued)

FOREIGN PATENT DOCUMENTS

JP    2002-171194 A    6/2002
JP    2003-008469 A    1/2003
(Continued)

OTHER PUBLICATIONS

International Search Report for PCT/JP2021/028535 dated Sep. 14, 2021.

*Primary Examiner* — Golam Sorowar
(74) *Attorney, Agent, or Firm* — Pearne & Gordon LLP (57) ABSTRACT

A radio frequency module includes a transmit filter that allows a transmit signal of a band A for FDD to pass through, a receive filter that allows a receive signal of the band A to pass through, a filter that allows a transmit/receive signal of a band B for TDD to pass through, power amplifiers, a low noise amplifier, a switch between connecting the receive filter to the low noise amplifier and connecting the filter to the low noise amplifier, a switch between connecting the filter to the power amplifier and connecting the filter to the low noise amplifier, a matching circuit connected between the power amplifier and the transmit filter, a matching circuit connected between the power amplifier and the switch, and a module board. On the module board, each of the power amplifiers and the switch is arranged in between the matching circuit and the matching circuit.

20 Claims, 4 Drawing Sheets

(58) Field of Classification Search
CPC ... H04B 1/44; H04B 1/04; H04B 1/18; H04B 1/40; H04B 1/50; H04B 1/0475; H04B 1/0064; H04B 1/0483; H04B 1/0078; H04B 1/0067; H04B 1/16; H04B 1/48; H04B 1/10; H04B 1/1036; H04B 1/56; H04B 2001/0416; H04B 1/03; H04B 1/401; H04B 1/406; H04B 1/52; H04B 1/0053; H04B 7/0602; H04B 7/0802; H04B 2001/485; H04B 7/0413; H03F 2200/451; H03F 2200/294; H03F 3/245; H03F 2200/111; H03F 3/72; H03F 2203/7209; H03F 3/195; H03F 3/19; H03F 3/24; H03F 2200/171; H03F 1/56; H03F 2200/222; H03F 1/565; H03F 3/211; H03F 3/68; H03F 2200/537; H03F 3/21; H03F 1/0277; H03F 2200/534; H04L 5/14; H04L 5/001; H04L 5/1469; H04L 5/1461; H04L 27/0002; H04L 5/143; H04L 27/0008; H04L 5/0005; H04L 5/0023; H04L 5/1423; H04L 5/16; H04L 1/02; H04L 27/2601; H04L 27/2647; H04L 5/00; H04W 88/06; H04W 52/52; H04W 52/283; H04W 52/286; H04W 52/346; H04W 72/0453; H04W 72/20; H04W 16/26; H04W 52/02; H04W 52/243; H04W 72/00; H04W 84/042; H04W 84/12; H04W 88/08
See application file for complete search history.

(56) References Cited

U.S. PATENT DOCUMENTS

| | | |
|---|---|---|
| 2016/0241196 A1 | 8/2016 | Lehtola |
| 2018/0294858 A1* | 10/2018 | Pehlke .................... H04B 1/40 |
| 2019/0115946 A1* | 4/2019 | Pehlke ................ H04B 1/0057 |
| 2019/0190548 A1 | 6/2019 | Chang et al. |
| 2020/0211998 A1 | 7/2020 | Uejima et al. |
| 2020/0412403 A1* | 12/2020 | Pehlke .................... H04L 5/14 |
| 2021/0226652 A1 | 7/2021 | Matsumoto et al. |
| 2021/0273670 A1 | 9/2021 | Yasuda |

FOREIGN PATENT DOCUMENTS

| | | |
|---|---|---|
| JP | 2020-039145 A | 3/2020 |
| JP | 2020-108069 A | 7/2020 |
| WO | 2020/090557 A1 | 5/2020 |
| WO | 2020/116460 A1 | 6/2020 |

* cited by examiner

RADIO FREQUENCY MODULE AND COMMUNICATION DEVICE

CROSS REFERENCE TO RELATED APPLICATION

This is a continuation of International Application No. PCT/JP2021/028535 filed on Aug. 2, 2021 which claims priority from Japanese Patent Application No. 2020-136565 filed on Aug. 13, 2020. The contents of these applications are incorporated herein by reference in their entireties.

BACKGROUND ART

Technical Field

The present disclosure relates to radio frequency modules and communication devices.

In mobile communication devices such as mobile phones and the like, particularly, with developments of multiband systems, the layout configuration of circuit elements making up a radio frequency front-end circuit becomes more complicated.

Patent Document 1 discloses a front-end circuit capable of performing communications using a plurality of communication bands (frequency bands). Specifically, the front-end circuit has a first transmit path in which a first power amplifier, a first band selection switch, a plurality of duplexers each corresponding to each communication band, and an antenna switch are connected in this order, and a second transmit path in which a second power amplifier, a second band selection switch, a plurality of duplexers each corresponding to each communication band, and the antenna switch are connected in this order.

Patent Document 1: U.S. Patent Application Publication No. 2019/190548

BRIEF SUMMARY

However, it is conceivable that the front-end circuit disclosed in Patent Document 1 has both a FDD signal path transmitting a signal of a communication band for frequency division duplex (FDD) and a TDD signal path transmitting a signal of a communication band for time division duplex (TDD), and includes different transmit power amplifiers for the FDD signal path and the TDD signal path and a same receive low noise amplifier. In this case, when transmitting and receiving a signal of the communication band for FDD, there is an issue of degrading receiver sensitivity in the FDD signal path because an unwanted wave from the transmit power amplifier flows into the receive low noise amplifier via the TDD signal path due to coupling between output matching circuits of the different transmit power amplifiers.

The present disclosure provides a radio frequency module and a communication device, in each of which the degradation of receiver sensitivity in the FDD signal path is suppressed.

A radio frequency module according to one aspect of the present disclosure includes: a first transmit filter having a pass band that includes an uplink operation band of a first communication band for FDD; a first receive filter having a pass band that includes a downlink operation band of the first communication band; a second filter having a pass band that includes a second communication band for TDD; a first power amplifier capable of amplifying a transmit signal of the first communication band; a second power amplifier capable of amplifying a transmit signal of the second communication band; a low noise amplifier capable of amplifying a receive signal of the first communication band and a receive signal of the second communication band; a first switch that switches between connecting the first receive filter to the low noise amplifier and connecting the second filter to the low noise amplifier; a second switch that switches between connecting the second filter to the second power amplifier and connecting the second filter to the low noise amplifier; a first impedance matching circuit connected between the first power amplifier and the first transmit filter; a second impedance matching circuit connected between the second power amplifier and the second switch; and a module board having a principal surface. The first power amplifier, the second power amplifier, the second switch, the first impedance matching circuit, and the second impedance matching circuit are arranged on the principal surface, and in a plan view of the module board, each of the first power amplifier, the second power amplifier, and the second switch is arranged in between the first impedance matching circuit and the second impedance matching circuit.

According to the present disclosure, it becomes possible to provide a radio frequency module and a communication device, in each of which the degradation of receiver sensitivity in the FDD path is suppressed.

DETAILED DESCRIPTION

Hereinafter, embodiments of the present disclosure will be described in detail with reference to the drawings. Note that the embodiments which will be described below each illustrates a comprehensive or specific example. Numeric values, shapes, materials, constituent elements, arrangements and connection modes of the constituent elements, and the like illustrated in the following embodiments are mere examples, and not intended to limit the present disclosure.

Note that each drawing is a schematic diagram in which emphasis, omission, or ratio adjustment is performed if appropriate to illustrate the present disclosure and is not precisely drawn, and in some cases, the shape, spatial relationship, and ratio are different from the actual ones. In all the drawing, same reference characters are attached to substantially the same constituent elements, and in some cases, an overlapping description is omitted or simplified.

In each of the following drawings, the x-axis and y-axis are axes orthogonal to each other on a plane parallel to a principal surface of a module board. Further, the z-axis is an axis vertical to the principal surface of the module board, the positive direction thereof indicates up direction, and the negative direction thereof indicates down direction.

Further, in the circuit configuration of the present disclosure, the term "being connected" is defined to include not only the case of being directly connected via a connection terminal and/or a wiring conductor but also include the case of being electrically connected via another circuit element. Further, the term "to be connected between A and B" means to be connected to both A and B in between A and B.

Further, in the module configuration of the present disclosure, a "plan view" means that an object is viewed using orthographic projection onto the x-y plane from the positive side of the z-axis. The term "a component is arranged on a principal surface of a board" is defined to include not only the case where a component is arranged on a principal surface of a board while the component is touching the principal surface of the board but also the case where the component is arranged above the principal surface of the board without necessarily touching the principal surface of the board and the case where the component is arranged on the board in such a way that part of the component is buried into the board from the principal surface side. The term "A is arranged between B and C" means that at least one of lines each connecting an arbitrary point in B and an arbitrary point in C goes through A. Further, terms indicating relationships among elements, such as "parallel", "vertical", and the like and terms indicating shapes of elements such as "rectangle" and the like are used not only to represent their precise meanings but also include their substantially equivalent ranges, for example, errors of about few %.

Embodiment

1 Circuit Configuration of Radio Frequency Module 1 and Communication Device 5

Figure 1:
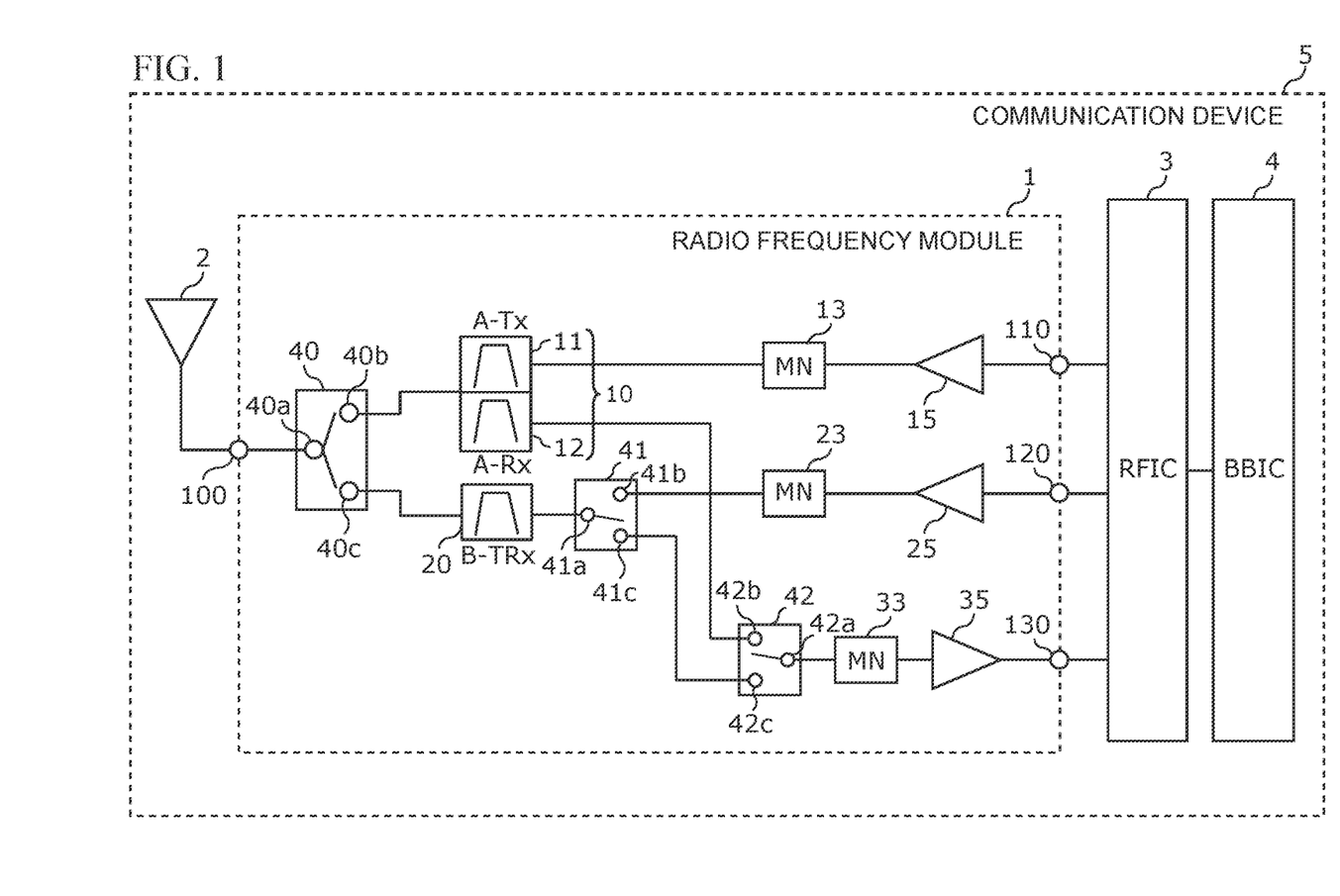
FIG. 1 is a circuit configuration diagram of a radio frequency module and a communication device according to an embodiment.

A circuit configuration of a radio frequency module 1 and a communication device 5 according to the present embodiment is described with reference to FIG. 1. FIG. 1 is a circuit configuration diagram of the radio frequency module 1 and the communication device 5 according to the embodiment.

1.1 Circuit Configuration of Communication Device 5

First, the circuit configuration of the communication device 5 is described. As illustrated in FIG. 1, the communication device 5 according to the present embodiment includes the radio frequency module 1, an antenna 2, a RF signal processing circuit (RFIC) 3, and a base band signal processing circuit (BBIC) 4.

The radio frequency module 1 transmits radio frequency signals between the antenna 2 and the RFIC 3. The radio frequency module 1 can be used as a module that can transmit and receive a radio frequency signal of TDD and that can transmit and receive a radio frequency signal of FDD. The circuit configuration of the radio frequency module 1 will be described later in detail.

The antenna 2 is connected to an antenna connection terminal 100 of the radio frequency module 1, transmits a radio frequency signal output from the radio frequency module 1, receives a radio frequency signal from outside, and outputs the received radio frequency signal to the radio frequency module 1.

The RFIC 3 is one example of a signal processing circuit that performs processing on a radio frequency signal. Specifically, the RFIC 3 performs signal processing on a radio frequency receive signal input via a receive path of the radio frequency module 1 using down-converting and the like, and outputs a receive signal generated by this signal processing to the BBIC 4. Further, the RFIC 3 performs signal processing on a transmit signal input from the BBIC 4 using up-converting and the like, and outputs a radio frequency transmit signal generated by this signal processing to a transmit path of the radio frequency module 1 via an amplifier circuit and the like. Further, the RFIC 3 includes a control part that controls switches, amplifiers, and the like included in the radio frequency module 1. Note that part or all of the functions of the control part of the RFIC 3 may be installed outside of the RFIC 3. For example, part or all of the functions of the control part of the RFIC 3 may be installed in the BBIC 4 or the radio frequency module 1.

The BBIC 4 is a base band signal processing circuit that performs signal processing using an intermediate frequency band, which is lower in frequency than a radio frequency signal being transmitted by the radio frequency module 1. As the signal to be processed in the BBIC 4, for example, an image signal for image display and/or an audio signal for communication through a speaker is used.

Note that in the communication device 5 according to the present embodiment, the antenna 2 and the BBIC 4 are optional constituent elements.

1.2 Circuit Configuration of Radio Frequency Module 1

Next, the circuit configuration of the radio frequency module 1 is described. As illustrated in FIG. 1, the radio frequency module 1 includes a transmit filter 11, a receive filter 12, a filter 20, power amplifiers 15 and 25, a low noise amplifier 35, switches 40, 41, and 42, matching circuits (MN) 13, 23, and 33, the antenna connection terminal 100, transmit input terminals 110 and 120, and a receive output terminal 130.

The antenna connection terminal 100 is connected to the antenna 2.

The transmit input terminal 110 is a terminal for receiving a transmit signal from outside of the radio frequency module 1. Specifically, the transmit input terminal 110 is a terminal for receiving a transmit signal of a communication band A for FDD. The transmit input terminal 120 is a terminal for receiving a transmit signal from outside of the radio frequency module 1. Specifically, the transmit input terminal 120 is a terminal for receiving a transmit signal of a communication band B for TDD. The receive output terminal 130 is a terminal for supplying a receive signal to outside of the radio frequency module 1. Specifically, the receive output terminal 130 is a terminal for supplying receive signals of the communication bands A and B to the RFIC 3.

Here, the communication bands mean frequency bands defined in advance by a standards group for a communication system (for example, 3GPP (3rd Generation Partnership Project), IEEE (Institute of Electrical and Electronics Engineers), and the like) or any other similar group. The communication system means a communication system constructed based on a radio access technology (RAT). As the communication system, for example, a 5GNR (5th Generation New Radio) system, an LTE (Long Term Evolution) system, a WLAN (Wireless Local Area Network) system, and the like can be used. However, the communication system is not limited thereto.

The communication band A is one example of a first communication band and is a communication band for FDD. The communication band B is one example of a second communication band and is a communication band for TDD. The communication band A and the communication band B can be used for simultaneous communication.

Note that the term "a plurality of communication bands can be used for simultaneous communication" means that a plurality of communication bands is allowed to be used for at least one of simultaneous transmission, simultaneous reception, and simultaneous transmission and reception. At that time, a single use of any one of the plurality of communication bands is not excluded. A combination of communication bands that can be used for simultaneous communication is defined in advance by, for example, a standards group for a communication system or any other similar group.

The transmit filter 11 (A-Tx) is one example of a first transmit filter and has a pass band that includes an uplink operation band (transmit band) of the communication band A. Because of this, the transmit filter 11 allows a transmit signal of the communication band A to pass through. An input terminal of the transmit filter 11 is connected to an output terminal of the power amplifier 15 via the matching circuit 13, and an output terminal of the transmit filter 11 is connected to a selection terminal 40b of the switch 40.

The receive filter 12 (A-Rx) is one example of a first receive filter and has a pass band that includes a downlink operation band (receive band) of the communication band A. Because of this, the receive filter 12 allows a receive signal of the communication band A to pass through. An input terminal of the receive filter 12 is connected to a selection terminal 40b of the switch 40, and an output terminal of the receive filter 12 is connected to an input terminal of the low noise amplifier 35 via the switch 42 and the matching circuit 33.

The transmit filter 11 and the receive filter 12 make up a duplexer 10 that allows a transmit signal and a receive signal of the communication band A to pass through.

The filter 20 (B-TRx) is one example of a second filter and has a pass band that includes the communication band B. Because of this, the filter 20 allows a transmit signal and a receive signal of the communication band B to pass through. One terminal of the filter 20 is connected to a selection terminal 40c of the switch 40, and the other terminal of the filter 20 is connected to a common terminal 41a of the switch 41.

The power amplifier 15 is one example of a first power amplifier and is connected between the transmit filter 11 and the transmit input terminal 110. The power amplifier 15 can amplify a transmit signal of the communication band A input from the transmit input terminal 110.

The power amplifier 25 is one example of a second power amplifier and is connected between the switch 41 and the transmit input terminal 120. The power amplifier 25 can amplify a transmit signal of the communication band B input from the transmit input terminal 120.

The low noise amplifier 35 is connected between the switch 42 and the receive output terminal 130. The low noise amplifier 35 can amplify (1) a receive signal of the communication band A input from the antenna connection terminal 100 via the switch 40, the receive filter 12, the switch 42, and the matching circuit 33 and (2) a receive signal of the communication band B input from the antenna connection terminal 100 via the switch 40, the filter 20, the switch 41, the switch 42, and the matching circuit 33. The receive signals of the communication bands A and B amplified by the low noise amplifier 35 are output to the receive output terminal 130.

The switch 40 is one example of a third switch and is connected between the antenna connection terminal 100 and filters which are the duplexer 10 and the filter 20. Specifically, the switch 40 has a common terminal 40a and the selection terminals 40b and 40c. The common terminal 40a is connected to the antenna connection terminal 100, the selection terminal 40b is connected to the duplexer 10, and the selection terminal 40c is connected to the filter 20.

With this connection configuration, for example, based on a control signal from the RFIC 3, the switch 40 can connect the common terminal 40a to at least one of the selection terminals 40b and 40c. That is to say, the switch 40 switches between connecting and disconnecting the antenna connection terminal 100 to/from the transmit filter 11 and the receive filter 12 and further switches between connecting and disconnecting the antenna connection terminal 100 to/from the filter 20. The switch 40 is, for example, made up of a multi-connection type switch circuit and is sometimes referred to as an antenna switch.

The switch 41 is one example of a second switch and is connected between the filter 20 and amplifiers which are the power amplifier 25 and the low noise amplifier 35. Specifically, the switch 41 has the common terminal 41a and selection terminals 41b and 41c. The common terminal 41a is connected to the other terminal of the filter 20, the selection terminal 41b is connected to an output terminal of the power amplifier 25 via the matching circuit 23, and the selection terminal 41c is connected to the receive output terminal 130 via the switch 42 and the matching circuit 33.

With this connection configuration, for example, based on a control signal from the RFIC 3, the switch 41 can connect the common terminal 41a to one of the selection terminals 41b and 41c. That is to say, the switch 41 can switch between connecting the filter 20 and the power amplifier 25 and connecting the filter 20 and the low noise amplifier 35. The switch 41 is, for example, made up of a single pole double throw (SPDT) type switch circuit and is sometimes referred to as a TDD switch.

The switch 42 is one example of a first switch and is connected between filters, which are the receive filter 12 and the filter 20, and the low noise amplifier 35. Specifically, the switch 42 has a common terminal 42a and selection terminals 42b and 42c. The common terminal 42a is connected to an input terminal of the low noise amplifier 35 via the matching circuit 33, the selection terminal 42b is connected to an output terminal of the receive filter 12, and the selection terminal 42c is connected to the other terminal of the filter 20 via the switch 41.

With this connection configuration, for example, based on a control signal from the RFIC 3, the switch 42 can connect the common terminal 42a to one of the selection terminals 42b and 42c. That is to say, the switch 42 can switch between connecting the receive filter 12 to the low noise amplifier 35 and connecting the filter 20 to the low noise amplifier 35. The switch 42 is, for example, made up of a SPDT type switch circuit and is sometimes referred to as a band selection switch.

The matching circuit 13 is one example of a first impedance matching circuit and is connected between the power amplifier 15 and the transmit filter 11. The matching circuit 13 is, for example, made up of an inductor and/or a capacitor and can provide impedance matching between the power amplifier 15 and the transmit filter 11.

The matching circuit 23 is one example of a second impedance matching circuit and is connected between the power amplifier 25 and the switch 41. The matching circuit 23 is, for example, made up of an inductor and/or a capacitor and can provide impedance matching between the power amplifier 25 and the filter 20.

The matching circuit 33 is connected between the low noise amplifier 35 and filters which are the receive filter 12 and the filter 20. The matching circuit 33 is, for example, made up of an inductor and/or a capacitor and can provide impedance matching between the low noise amplifier 35 and the receive filter 12 and provide impedance matching between the low noise amplifier 35 and the filter 20.

Note that some of circuit elements illustrated in FIG. 1 are not necessarily included in the radio frequency module 1. For example, the radio frequency module 1 only needs to include at least the duplexer 10, the filter 20, the power amplifiers 15 and 25, the low noise amplifier 35, the switches 41 and 42, and the matching circuits 13 and 23, and do not necessarily include other circuit elements.

Further, the radio frequency module 1 may include a signal path that transmits a radio frequency signal of a communication band different from the communication bands A and B. Note that in the signal path that transmits a radio frequency signal of the communication band different from the communication bands A and B, at least a filter whose pass band is the communication band different from the communication bands A and B is installed.

2 Flow of Signal Transmission in Communication Device 5

Figure 2:
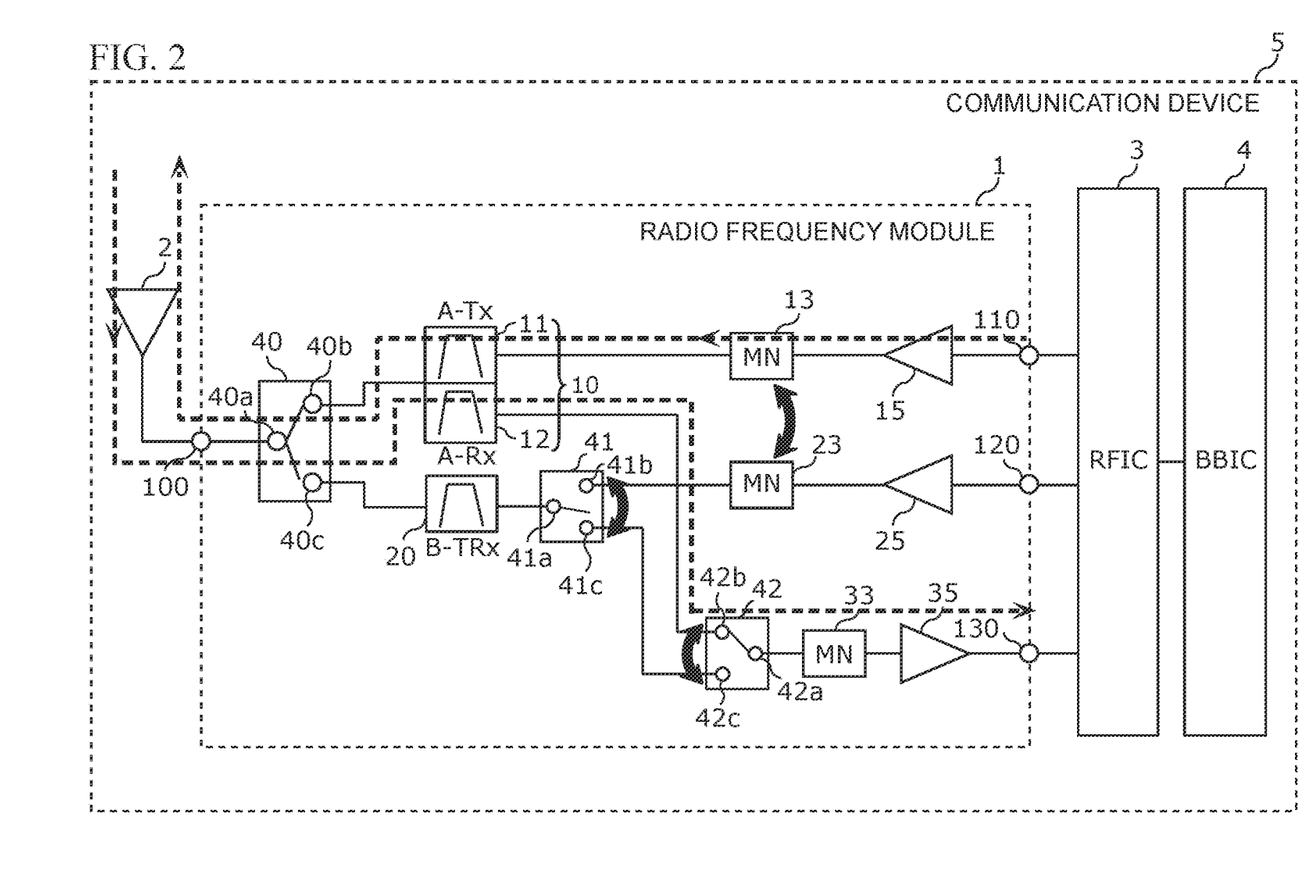
FIG. 2 is a diagram illustrating flows of signals of FDD transmission in the radio frequency module and the communication device according to the embodiment.

Next, the flow of signal transmission in the radio frequency module 1 and the communication device 5, which are configured as above, is described with reference to the FIG. 2. FIG. 2 is a diagram illustrating flows of signals of FDD transmission in the radio frequency module 1 and the communication device 5 according to the embodiment.

As illustrated in FIG. 2, in the radio frequency module 1 and the communication device 5 according to the present embodiment, for example, a transmit signal of the communication band A and a receive signal of the communication band A are being transmitted simultaneously. Specifically, a transmit signal of the communication band A is output from the antenna 2 via the transmit input terminal 110, the matching circuit 13, the transmit filter 11, the switch 40, and the antenna connection terminal 100. Further, a receive signal of the communication band A is output from the receive output terminal 130 via the antenna 2, the antenna connection terminal 100, the receive filter 12, the switch 42, the matching circuit 33, and the low noise amplifier 35.

At that time, when electromagnetic coupling is established between the matching circuit 13 and the matching circuit 23, a high power transmit signal output from the power amplifier 15 flows into a transmit path of the communication band B via the matching circuit 13 and the matching circuit 23 as an unwanted wave signal. This unwanted wave signal leaks from the selection terminal 41b to the selection terminal 41c of the switch 41 through an off capacitance. Moreover, a leaked unwanted wave signal further leaks from the selection terminal 42c of the switch 42, which is in the electrically disconnected state, to the selection terminal 42b and the common terminal 42a through an off capacitance. Finally, a leaked unwanted wave signal flows into the low noise amplifier 35 and degrades the receiver sensitivity for a receive signal of the communication band A, which is being transmitted simultaneously with a transmit signal of the communication band A.

In the communication band A for FDD, in the case where a transmit signal and a receive signal are being transmitted simultaneously, the duplexer 10 is installed in order to prevent a transmit signal output from the power amplifier 15 and a receive band noise from flowing into the receive path. However, when the total value of the isolation at the time the switch 41 for TDD is electrically disconnected and the isolation at the time the switch 42 for band selection is electrically disconnected becomes substantially equal to a level of the isolation between transmission and reception of the duplexer 10, degradation of receiver sensitivity such as the one described above occurs.

In contrast, the radio frequency module 1 according to the present embodiment has the configuration that suppresses the formation of electromagnetic coupling between the matching circuit 13 and the matching circuit 23. In the following section, the foregoing configuration of the radio frequency module 1 according to the present embodiment that suppresses the electromagnetic coupling is described.

3 Component Layout of Radio Frequency Module

Figure 3:
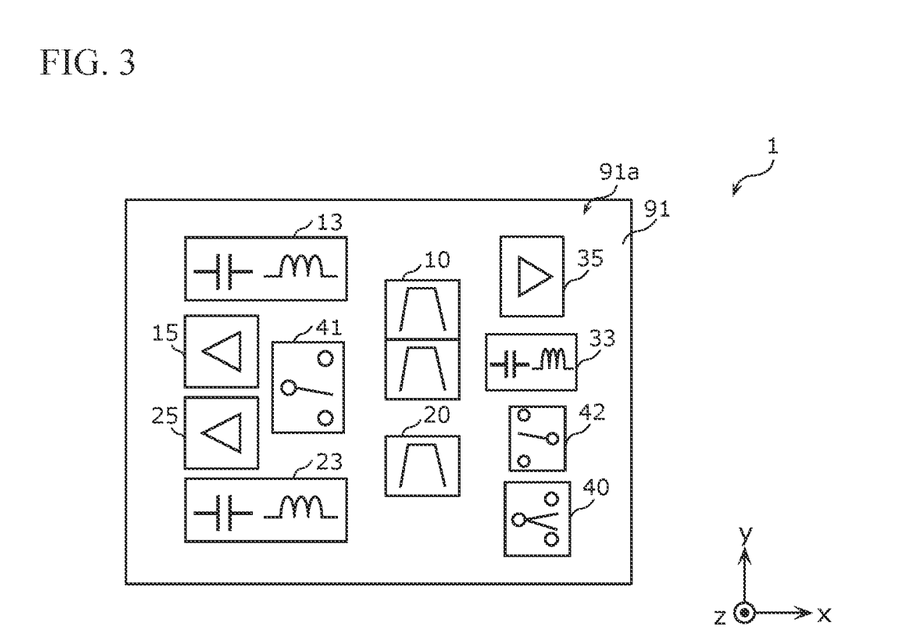
FIG. 3 is a plan view of the radio frequency module according to the embodiment.

Next, a component layout of the radio frequency module 1 configured as above is described specifically with reference to FIG. 3.

FIG. 3 is a plan view of the radio frequency module 1 according to an embodiment. Specifically, FIG. 3 is a diagram illustrating a principal surface 91a of a module board 91 seen from the positive side of the z-axis. As illustrated in FIG. 3, the radio frequency module 1 further includes the module board 91, in addition to circuit components that make up the circuits illustrated in FIG. 1.

The module board 91 has the principal surface 91a whose normal is the z-axis. As the module board 91, for example, a low temperature co-fired ceramics (LTCC) board, a high temperature co-fired ceramics (HTCC) board, a board including components, a board including a redistribution layer (RDL), a printed board, or the like, each of which has a multilayer structure including a plurality of dielectric layers, can be used, but the module board 91 is not limited thereto. Note that on the module board 91, the antenna connection terminal 100, the transmit input terminals 110 and 120, and the receive output terminal 130 may be formed.

As illustrated in FIG. 3, on the principal surface 91a, the duplexer 10, the filter 20, the power amplifiers 15 and 25, the low noise amplifier 35, the switches 40, 41, and 42, and the matching circuits (MN) 13, 23, and 33 are arranged.

Note that although it is not illustrated in the drawing, wiring lines that make up signal paths including the transmit path and the receive path illustrated in FIG. 1 are formed in the inside of the module board 91 and on the principal surface 91a. Further, the foregoing wiring line may be a bonding wire whose two end portions are bonded on the principal surface 91a and one of circuit components that make up the radio frequency module 1 or may be a terminal, an electrode, or a wiring line, which is formed on a surface of a circuit component included in the radio frequency module 1.

Further, a resin member may be arranged in such a manner as to cover the foregoing circuit components arranged on the principal surface 91a. Moreover, a metal shield layer in contact with an outer surface of the foregoing resin member and side surfaces of the module board 91 may also be formed.

Here, in a plan view of the module board 91, each of the power amplifiers 15 and 25 and the switch 41 is arranged in between the matching circuit 13 and the matching circuit 23.

According to this, the power amplifiers 15 and 25 and the switch 41 are arranged in between the matching circuit 13 and the matching circuit 23, and thus a long distance can be secured between the matching circuit 13 and the matching circuit 23. Further, the power amplifiers 15 and 25 and the switch 41, which are conductive components, are present in between the matching circuit 13 and the matching circuit 23.

Because of this, the electromagnetic coupling between the matching circuit 13 and the matching circuit 23 can be suppressed, and thus it becomes possible to suppress a flow of an unwanted wave signal of a transmit signal of the communication band A into the receive path of the communication band A through the foregoing electromagnetic coupling, the switch 41, and the switch 42. Accordingly, the isolation between transmission and reception of the communication band A for FDD can be improved, and the degradation of receiver sensitivity can be suppressed.

Note that the duplexer 10, the filter 20, the low noise amplifier 35, the matching circuit 33, and the switches 40 and 42 may be arranged on a principal surface opposite the principal surface 91a or may be buried in the module board 91.

Note that in the plan view of the module board 91, the matching circuit 13 and the power amplifier 15 are arranged next to each other with no conductive component interposed therebetween.

According to this, the wiring line connecting the matching circuit 13 and the power amplifier 15 can be shortened, and thus the transmission loss of a transmit signal of the communication band A can be reduced.

Further, in the plan view of the module board 91, the matching circuit 23 and the power amplifier 25 are arranged next to each other with no conductive component interposed therebetween.

According to this, the wiring line connecting the matching circuit 23 and the power amplifier 25 can be shortened, and thus the transmission loss of a transmit signal of the communication band B can be reduced.

Note that the conductive component is an electronic component having a conductive member such as an electrode for signal retrieval or the like and is, for example, at least a chip resistor, a chip capacitor, a chip inductor, a filter, a switch, or an active element, such as an amplifier, a control circuit, or the like.

Figure 4:
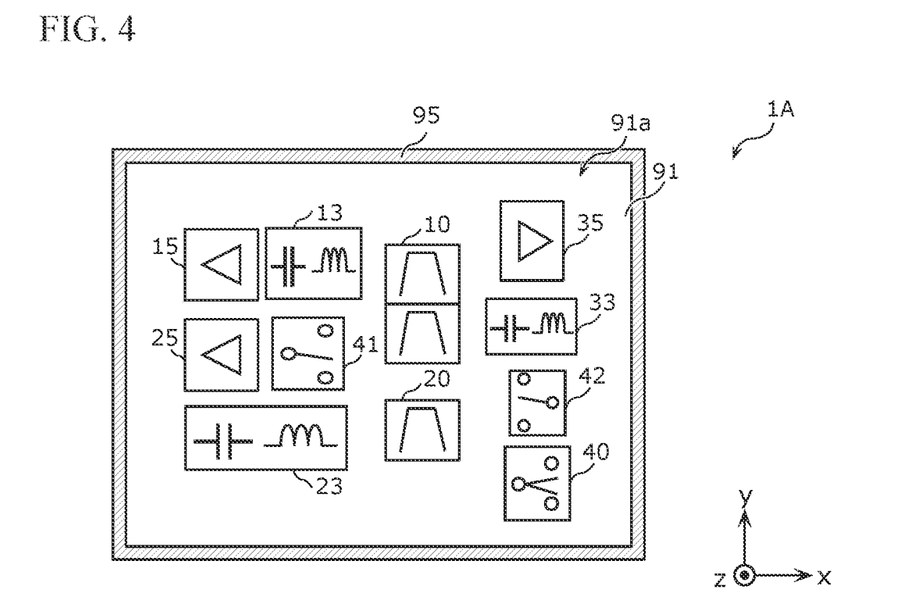
FIG. 4 is a plan view of a radio frequency module according to a modified example 1 of the embodiment.

FIG. 4 is a plan view of a radio frequency module 1A according to a modified example 1 of the embodiment. As illustrated in FIG. 4, in the radio frequency module 1A according to the present modified example, the duplexer 10, the filter 20, the power amplifiers 15 and 25, the low noise amplifier 35, the switches 40, 41, and 42, and the matching circuits (MN) 13, 23, and 33 are arranged on the principal surface 91a. Compared with the radio frequency module 1 according to the embodiment, the radio frequency module 1A according to the present modified example is different in the layout configuration of the matching circuits 13 and 23, the power amplifiers 15 and 25, and the switch 41 and in additionally having a metal shield layer 95. Hereinafter, the radio frequency module 1A according to the present modified example is described with the emphasis on points different from the radio frequency module 1 according to the embodiment, and the description for the same point as the radio frequency module 1 according to the embodiment is omitted.

The metal shield layer 95 is formed in such a manner as to be in contact with an outer surface of a resin member covering the foregoing circuit components arranged on the principal surface 91a and side surfaces of the module board 91. Note that in the present modified example, the metal shield layer 95 and the resin member are not necessarily included.

Here, in the plan view of the module board 91, each of the power amplifiers 15 and 25 and the switch 41 is arranged in between the matching circuit 13 and the matching circuit 23.

According to this, the power amplifiers 15 and 25 and the switch 41 are arranged in between the matching circuit 13 and the matching circuit 23, and thus a long distance can be secured between the matching circuit 13 and the matching circuit 23. Because of this, the electromagnetic coupling between the matching circuit 13 and the matching circuit 23 can be suppressed, and thus it becomes possible to suppress a flow of an unwanted wave signal of a transmit signal of the communication band A into the receive path of the communication band A through the foregoing electromagnetic coupling, the switch 41, and the switch 42. Accordingly, the isolation between transmission and reception of the communication band A for FDD can be improved, and the degradation of receiver sensitivity can be suppressed.

Note that the difference between the layout configuration of the radio frequency module 1A according to the present modified example and the layout configuration of the radio frequency module 1 according to the embodiment is that the power amplifier 15 is arranged on the x-axis negative direction side of the matching circuit 13.

According to this, the layout area for the matching circuits 13 and 23, the power amplifiers 15 and 25, and the switch 41 can be reduced, and thus the radio frequency module 1A can be downsized.

Figure 5:
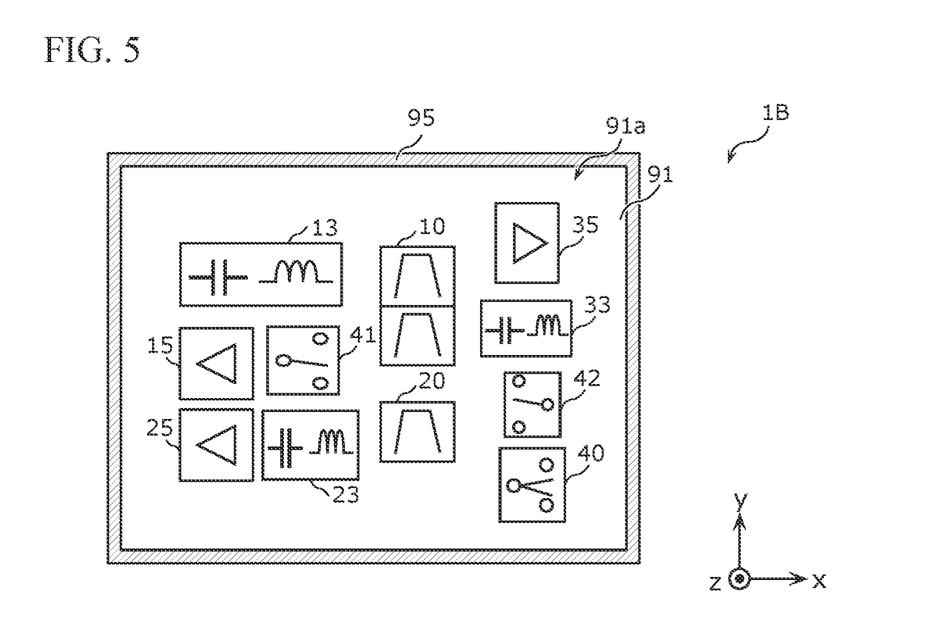
FIG. 5 is a plan view of a radio frequency module according to a modified example 2 of the embodiment.

FIG. 5 is a plan view of a radio frequency module 1B according to a modified example 2 of the embodiment. As illustrated in FIG. 5, in the radio frequency module 1B according to the present modified example, the duplexer 10, the filter 20, the power amplifiers 15 and 25, the low noise amplifier 35, the switches 40, 41, and 42, and the matching circuits (MN) 13, 23, and 33 are arranged on the principal surface 91a. The radio frequency module 1B according to the present modified example is different from the radio frequency module 1 according to the embodiment in the layout configuration of the matching circuits 13 and 23, the power amplifiers 15 and 25, and the switch 41 and in additionally having the metal shield layer 95. Hereinafter, the radio frequency module 1B according to the present modified example is described with the emphasis on points different from the radio frequency module 1 according to the embodiment, and the description for the same point as the radio frequency module 1 according to the embodiment is omitted.

The metal shield layer 95 is formed in such a manner as to be in contact with an outer surface of a resin member covering the foregoing circuit components arranged on the principal surface 91a and side surfaces of the module board 91. Note that in the present modified example, the metal shield layer 95 and the resin member are not necessarily included.

Here, in the plan view of the module board 91, each of the power amplifiers 15 and 25 and the switch 41 is arranged in between the matching circuit 13 and the matching circuit 23.

According to this, the power amplifiers 15 and 25 and the switch 41 are arranged in between the matching circuit 13 and the matching circuit 23, and thus a long distance can be secured between the matching circuit 13 and the matching circuit 23. Because of this, the electromagnetic coupling between the matching circuit 13 and the matching circuit 23 can be suppressed, and thus it becomes possible to suppress a flow of an unwanted wave signal of a transmit signal of the communication band A into the receive path of the communication band A through the foregoing electromagnetic coupling, the switch 41, and the switch 42. Accordingly, the isolation between transmission and reception of the communication band A for FDD can be improved, and the degradation of receiver sensitivity can be suppressed.

Note that the difference between the layout configuration of the radio frequency module 1B according to the present modified example and the layout configuration of the radio frequency module 1 according to the embodiment is that the power amplifier 25 is arranged on the x-axis negative direction side of the matching circuit 23.

According to this, the layout area for the matching circuits 13 and 23, the power amplifiers 15 and 25, and the switch 41 can be reduced, and thus the radio frequency module 1B can be downsized.

4 Effects and the Like

As described above, the radio frequency module 1 according to the present embodiment includes the transmit filter 11 having a pass band that includes the uplink operation band of the communication band A for FDD, the receive filter 12 having a pass band that includes the downlink operation band of the communication band A, the filter 20 having a pass band that includes the communication band B for TDD, the power amplifier 15 capable of amplifying a transmit signal of the communication band A, the power amplifier 25 capable of amplifying a transmit signal of the communication band B, the low noise amplifier 35 capable of amplifying receive signals of the communication bands A and B, the switch 42 that switches between connecting the receive filter 12 to the low noise amplifier 35 and connecting the filter 20 to the low noise amplifier 35, the switch 41 that switches between connecting the filter 20 to the power amplifier 25 and connecting the filter 20 to the low noise amplifier 35, the matching circuit 13 connected between the power amplifier 15 and the transmit filter 11, the matching circuit 23 connected between the power amplifier 25 and the switch 41, and the module board 91 having the principal surfaces 91a. The power amplifiers 15 and 25, the switch 41, and the matching circuits 13 and 23 are arranged on the principal surface 91a, and in the plan view of the module board 91, each of the power amplifiers 15 and 25 and the switch 41 is arranged in between the matching circuit 13 and the matching circuit 23.

According to this, the power amplifiers 15 and 25 and the switch 41 are arranged in between the matching circuit 13 and the matching circuit 23, and thus a long distance can be secured between the matching circuit 13 and the matching circuit 23. Further, the power amplifiers 15 and 25 and the switch 41, which are conductive components, are present in between the matching circuit 13 and the matching circuit 23. Because of this, the electromagnetic coupling between the matching circuit 13 and the matching circuit 23 can be suppressed, and thus it becomes possible to suppress a flow of an unwanted wave signal of a transmit signal of the communication band A into the receive path of the communication band A through the foregoing electromagnetic coupling, the switch 41, and the switch 42. Accordingly, the isolation between transmission and reception of the communication band A for FDD can be improved, and the degradation of receiver sensitivity can be suppressed.

Further, in the radio frequency module 1, in the plan view of the module board 91, the matching circuit 13 and the power amplifier 15 may be arranged next to each other with no conductive component interposed therebetween.

According to this, the wiring line connecting the matching circuit 13 and the power amplifier 15 can be shortened, and thus the transmission loss of a transmit signal of the communication band A can be reduced.

Further, in the radio frequency module 1, in the plan view of the module board 91, the matching circuit 23 and the power amplifier 25 may be arranged next to each other with no conductive component interposed therebetween.

According to this, the wiring line connecting the matching circuit 23 and the power amplifier 25 can be shortened, and thus the transmission loss of a transmit signal of the communication band B can be reduced.

Further, the radio frequency module 1 may further include the switch 40 that switches between connecting and disconnecting the antenna connection terminal 100 to/from the transmit filter 11 and the receive filter 12 and further switches between connecting and disconnecting the antenna connection terminal 100 to/from the filter 20.

According to this, isolation between the signal path of the communication band A and the signal path of the communication band B can be improved.

Further, the communication device 5 according to the present embodiment includes the RFIC 3 that performs processing on a radio frequency signal and the radio frequency module 1 that transmits radio frequency signals between the RFIC 3 and the antenna 2.

According to this, the communication device 5 can produce substantially the same effects as the radio frequency module 1.

Other Embodiments

The radio frequency modules and the communication devices according to the present disclosure have been described using the embodiment and the modified examples. However, the radio frequency module and the communication device according to the present disclosure are not limited to the foregoing embodiment and modified examples. Other embodiments realized by combining optional constituent elements of the foregoing embodiment and modified examples, modified examples obtained by applying various modifications conceivable to those skilled in the art to the foregoing embodiment and modified examples without necessarily departing the scope of the present disclosure, and various devices incorporating the foregoing radio frequency modules and communication devices may also be included in the present disclosure.

For example, in the component layout configurations of the radio frequency modules according to the foregoing embodiment, the circuit components that make up the radio frequency module are arranged on one of the principal surfaces of the module board 91. However, the circuit components that make up the radio frequency module may be divided and arranged on a first principal surface and a second principal surface of the module board 91, which face each other. That is to say, the circuit components that make up the foregoing radio frequency module may be mounted on one surface of the module board 91 or may be mounted on both surfaces of the module board 91.

For example, in the circuit configurations of the radio frequency modules and the communication devices according to the foregoing embodiment and modified examples, another circuit element, a wiring line, or the like may be inserted in a path connecting each circuit element and a signal path represented in the drawings.

For example, in the foregoing embodiment and modified examples, a filter or a matching circuit may be inserted between the antenna connection terminal 100 and the switch 40.

INDUSTRIAL APPLICABILITY

The present disclosure can be widely used in communication devices such as mobile phones and the like as a radio frequency circuit to be installed in a front-end unit.

REFERENCE SIGNS LIST 1, 1A, 1B Radio frequency module
2 Antenna
3 RF signal processing circuit (RFIC)
4 Base band signal processing circuit (BBIC)
5 Communication device
10 Duplexer
11 Transmit filter
12 Receive filter
13, 23, 33 Matching circuit
15, 25 Power amplifier
20 Filter
35 Low noise amplifier
40, 41, 42 Switch
40a, 41a, 42a Common terminal
40b, 40c, 41b, 41c, 42b, 42c Selection terminal
91 Module board
91a Principal surface
95 Metal shield layer
100 Antenna connection terminal
110, 120 Transmit input terminal
130 Receive output terminal

The invention claimed is:

1. A radio frequency module comprising:
a first transmit filter comprising a pass band that includes an uplink operation band of a first communication band for frequency division duplex (FDD);
a first receive filter comprising a pass band that includes a downlink operation band of the first communication band;
a second filter comprising a pass band that includes a second communication band for time division duplex (TDD);
a first power amplifier configured to amplify a transmit signal of the first communication band;
a second power amplifier configured to amplify a transmit signal of the second communication band;
a low noise amplifier configured to amplify a receive signal of the first communication band and a receive signal of the second communication band;
a first switch that is configured to selectively connect the low noise amplifier to the first receive filter or the second filter;
a second switch that is configured to selectively connect the second filter to the second power amplifier or the low noise amplifier;
a first impedance matching circuit connected between the first power amplifier and the first transmit filter;
a second impedance matching circuit connected between the second power amplifier and the second switch; and
a module board comprising a principal surface, wherein
the first power amplifier, the second power amplifier, the second switch, the first impedance matching circuit, and the second impedance matching circuit are arranged on the principal surface, and
in a plan view of the module board, each of the first power amplifier, the second power amplifier, and the second switch is arranged in between the first impedance matching circuit and the second impedance matching circuit.

2. The radio frequency module according to claim 1, wherein
in the plan view of the module board, the first impedance matching circuit and the first power amplifier are arranged next to each other with no conductive component interposed therebetween.

3. The radio frequency module according to claim 2, further comprising:
a third switch that is configured to selectively connect and disconnect an antenna connection terminal to/from the first transmit filter and the first receive filter, and selectively connect the antenna connection terminal to/from the second filter.

4. A communication device comprising:
a signal processing circuit that is configured to process a radio frequency signal; and
the radio frequency module according to claim 2 that is configured to transmit the radio frequency signal between the signal processing circuit and an antenna.

5. The radio frequency module according to claim 2, further comprising:
a third impedance matching circuit that is connected between the lower noise amplifier and one or more of the first receive filter and the second filter.

6. The radio frequency module according to claim 2, further comprising:
a third impedance matching circuit that is connected between the first switch and the low noise amplifier.

7. The radio frequency module according to claim 1, wherein
in the plan view of the module board, the second impedance matching circuit and the second power amplifier are arranged next to each other with no conductive component interposed therebetween.

8. The radio frequency module according to claim 7, further comprising:
a third switch that is configured to selectively connect and disconnect an antenna connection terminal to/from the first transmit filter and the first receive filter, and selectively connect the antenna connection terminal to/from the second filter.

9. A communication device comprising:
a signal processing circuit that is configured to process a radio frequency signal; and
the radio frequency module according to claim 7 that is configured to transmit the radio frequency signal between the signal processing circuit and an antenna.

10. The radio frequency module according to claim 7, further comprising:
a third impedance matching circuit that is connected between the lower noise amplifier and one or more of the first receive filter and the second filter.

11. The radio frequency module according to claim 7, further comprising:
a third impedance matching circuit that is connected between the first switch and the low noise amplifier.

12. The radio frequency module according to claim 1, further comprising:
a third switch that is configured to selectively connect and disconnect an antenna connection terminal to/from the first transmit filter and the first receive filter, and selectively connect the antenna connection terminal to/from the second filter.

13. A communication device comprising:
a signal processing circuit that is configured to process a radio frequency signal; and the radio frequency module according to claim 12 that is configured to transmit the radio frequency signal between the signal processing circuit and an antenna.

14. The radio frequency module according to claim 12, further comprising:
a third impedance matching circuit that is connected between the lower noise amplifier and one or more of the first receive filter and the second filter.

15. The radio frequency module according to claim 12, further comprising:
a third impedance matching circuit that is connected between the first switch and the low noise amplifier.

16. A communication device comprising:
a signal processing circuit that is configured to process a radio frequency signal; and
the radio frequency module according to claim 1 that is configured to transmit the radio frequency signal between the signal processing circuit and an antenna.

17. The radio frequency module according to claim 16, further comprising:
a third impedance matching circuit that is connected between the lower noise amplifier and one or more of the first receive filter and the second filter.

18. The radio frequency module according to claim 16, further comprising:
a third impedance matching circuit that is connected between the first switch and the low noise amplifier.

19. The radio frequency module according to claim 1, further comprising:
a third impedance matching circuit that is connected between the lower noise amplifier and one or more of the first receive filter and the second filter.

20. The radio frequency module according to claim 1, further comprising:
a third impedance matching circuit that is connected between the first switch and the low noise amplifier.

* * * * *